United States Patent
Anand et al.

(10) Patent No.: US 11,764,958 B2
(45) Date of Patent: Sep. 19, 2023

(54) SYSTEMS AND METHODS FOR DYNAMICALLY ENCRYPTING REDIRECT REQUESTS

(71) Applicant: Capital One Services, LLC, McLean, VA (US)

(72) Inventors: Aditya Anand, Great Falls, VA (US); Nitant Bhartia, Falls Church, VA (US); Saji Asok, Ashburn, VA (US); Zhi Zheng, Oakland Gardens, NY (US); Andrew Chen, Fayetteville, WV (US); Ghulam Sallman, Silver Spring, MD (US); Elvin Z. Lee, Herndon, VA (US)

(73) Assignee: Capital One Services, LLC, McLean, VA (US)

( * ) Notice: Subject to any disclaimer, the term of this patent is extended or adjusted under 35 U.S.C. 154(b) by 276 days.

(21) Appl. No.: 17/223,886

(22) Filed: Apr. 6, 2021

(65) Prior Publication Data

US 2022/0321338 A1    Oct. 6, 2022

(51) Int. Cl.
| | | |
|---|---|---|
| *H04L 9/08* | (2006.01) | |
| *H04L 9/32* | (2006.01) | |
| *H04L 67/55* | (2022.01) | |
| *H04L 67/568* | (2022.01) | |

(52) U.S. Cl.
CPC .......... *H04L 9/0891* (2013.01); *H04L 9/0825* (2013.01); *H04L 9/3213* (2013.01); *H04L 67/55* (2022.05); *H04L 67/568* (2022.05)

(58) Field of Classification Search
CPC ... H04L 9/0891; H04L 9/0825; H04L 9/3213; H04L 9/0894; H04L 63/0807; H04L 63/062; H04L 63/0442; H04L 67/53; H04L 67/63; H04L 67/55; H04L 67/568
See application file for complete search history.

(56) References Cited

U.S. PATENT DOCUMENTS

| | | | |
|---|---|---|---|
| 7,137,006 B1 * | 11/2006 | Grandcolas | H04L 63/0815 |
| | | | 713/180 |
| 9,935,934 B1 * | 4/2018 | Orozco | H04L 9/3213 |
| 10,826,895 B1 * | 11/2020 | Krut | H04L 9/0894 |
| 2005/0083974 A1 * | 4/2005 | Mayer | H04L 63/0428 |
| | | | 713/151 |
| 2005/0132222 A1 * | 6/2005 | Petrovic | H04L 63/0807 |
| | | | 726/4 |

(Continued)

*Primary Examiner* — Eric W Shepperd
(74) *Attorney, Agent, or Firm* — Banner & Witcoff, Ltd.

(57) ABSTRACT

Systems and methods for dynamically encrypting requests in accordance with embodiments of the invention are disclosed. In one embodiment, a computer-implemented method includes obtaining a notification indicating an updated private key has been issued for a third-party service, obtaining, based on the notification, an updated public encryption key associated with the third-party service, generating a security token for the third-party service, the security token associated with a caching system, obtaining, from a secured database and based on the security token, the updated private key, storing, using the caching system, a routing entry comprising the security token and encrypted based on the updated private key, receiving, from a client device, a request to access the third-party service, authenticating the request with the third-party service using the routing entry, and redirecting the client device to the third-party service.

20 Claims, 5 Drawing Sheets

(56) References Cited

U.S. PATENT DOCUMENTS

| | | | |
|---|---|---|---|
| 2007/0053334 A1* | 3/2007 | Sueyoshi | H04L 12/2898 370/338 |
| 2007/0198837 A1* | 8/2007 | Koodli | H04W 12/0471 713/153 |
| 2012/0054825 A1 | 3/2012 | Bassett et al. | |
| 2012/0204032 A1 | 8/2012 | Wilkins et al. | |
| 2013/0007840 A1* | 1/2013 | Sabin | H04L 63/20 726/3 |
| 2013/0061046 A1* | 3/2013 | Joy | H04L 12/1859 713/168 |
| 2013/0144755 A1* | 6/2013 | Mowatt | H04W 4/60 705/26.41 |
| 2014/0149741 A1* | 5/2014 | Balakrishnan | G06F 21/335 713/159 |
| 2014/0259135 A1* | 9/2014 | Postrel | H04L 63/18 726/7 |
| 2016/0359841 A1 | 12/2016 | Hitchcock et al. | |
| 2017/0012953 A1 | 1/2017 | Ylonen | |
| 2017/0230825 A1* | 8/2017 | Counterman | H04L 63/0876 |
| 2018/0255036 A1* | 9/2018 | Fiedler | H04L 63/045 |
| 2019/0014153 A1 | 1/2019 | Lang et al. | |
| 2019/0394041 A1* | 12/2019 | Jain | H04L 9/3247 |
| 2021/0058373 A1* | 2/2021 | Hall | H04L 45/02 |

* cited by examiner

SYSTEMS AND METHODS FOR DYNAMICALLY ENCRYPTING REDIRECT REQUESTS

TECHNICAL FIELD

Aspects described herein generally relate to encrypting data and more specifically to encrypting redirect requests in network communications.

BACKGROUND

Affiliate services can include online services provided to a business by one or more third-party vendors. The third-party vendors can provide their own websites for providing these services and the business can include the third-party websites within their online services.

Uniform resource locator (URL) redirection is a technique for associating a web page with one or more URLs. When a web browser attempts to navigate to a URL that has been redirected, a web page from a second URL is provided to the web browser, thereby redirecting users to the desired content.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below. Corresponding apparatus, systems, and computer-readable media are also within the scope of the disclosure.

Systems and methods in accordance with embodiments of the invention automatically generate and manage security data for providing users access to a variety of third-party services. A user can click on a link in a web page and be automatically authenticated and sent over to the corresponding third-party service without having to enter any additional credentials. In this way, the user connection to the third-party service can be encrypted. Additionally, the security data used to authenticate the user connection can be automatically generated and refreshed to limit the ability of an attacker to decrypt secure communications. In this way, the breach of any security data will be of limited (or no) value as the security data is regularly updated and older versions of the security data are retired. In contrast to prior art systems which either do not update the security data and/or manually update the security data, the functioning of the computing system itself is improved by automatically generating and distributing security data along with improving the efficiency of the computer memory by deprecating old security data.

In one embodiment, a computer-implemented method includes obtaining a notification indicating an updated private key has been issued for a third-party service, obtaining, based on the notification, an updated public encryption key associated with the third-party service, generating a security token for the third-party service, the security token associated with a caching system, obtaining, from a secured database and based on the security token, the updated private key, storing, using the caching system, a routing entry comprising the security token and encrypted based on the updated private key, receiving, from a client device, a request to access the third-party service, authenticating the received request with the third-party service using the routing entry, and redirecting, based on the authenticating, the client device to the third-party service.

In yet another embodiment of the invention, the notification is provided using a notification service provided by a distributed computing platform.

In still another embodiment of the invention, the caching system stores a first private key issued for the third-party service and the computer-implemented method further comprises deleting, based on storing the updated private key, the first private key from the caching system.

In yet still another embodiment of the invention, the caching system stores a first private key issued for the third-party service, the updated private key comprising a time to live indicator and the updated private key is obtained prior to expiration of the time to live indicator.

In yet another additional embodiment of the invention, the time to live indicator is determined by the third-party service.

In still another additional embodiment of the invention, the time to live indicator is approximately two hours.

In yet still another additional embodiment of the invention, the time to live indicator is approximately thirty days.

In yet another embodiment of the invention, redirecting the client device further comprises establishing, based on the updated private key, a secure communication channel between the client device and the third-party service.

Still another embodiment of the inventions includes an apparatus including one or more processors and memory storing instructions that, when executed by the one or more processors, cause the apparatus to obtain a notification indicating an updated private key has been issued for a third-party service, obtain, based on the notification, an updated public encryption key associated with the third-party service, generate a security token for the third-party service and associated with a caching system, the caching system storing a first private key issued for the third-party service, obtain, from a secured database and based on the security token, the updated private key, store, using the caching system by the security token, a routing entry comprising the security token and encrypted based on the updated private key, delete, based on storing the updated private key, the first private key from the caching system, receive, from a client device, a request to access the third-party service, authenticate the received request with the third-party service using the routing entry, and redirect, based on the authenticating, the client device to the third-party service.

In yet another embodiment of the invention, the notification is provided using a notification service provided by a distributed computing platform.

In still another embodiment of the invention, the caching system stores a first private key issued for the third-party service, the updated private key comprising a time to live indicator and the updated private key is obtained prior to expiration of the time to live indicator.

In yet still another embodiment of the invention, the time to live indicator is determined by the third-party service.

In yet another additional embodiment of the invention, the time to live indicator is approximately two hours.

In still another additional embodiment of the invention, the time to live indicator is approximately thirty days.

In yet still another additional embodiment of the invention, the instructions, when executed by the one or more processors, cause the apparatus to redirect the client device by causing the apparatus to establish, based on the updated private key, a secure communication channel between the client device and the third-party service.

Yet another embodiment of the invention includes a non-transitory machine-readable medium storing instructions that, when executed by one or more processors, cause the one or more processors to perform steps including obtaining, from a simple notification service provided by a distributed computing platform, a notification indicating an updated private key has been issued for a third-party service, obtaining, based on the notification, an updated public encryption key associated with the third-party service, generating a security token for the third-party service, the security token associated with a caching system, the caching system storing a first private key issued for the third-party service, obtaining, from a secured database and based on the security token, the updated private key, storing, using the caching system, a routing entry comprising the security token and encrypted based on the updated private key, deleting, based on storing the updated private key, the first private key from the caching system, receiving, from a client device, a request to access the third-party service, authenticating the received request with the third-party service using the routing entry, establishing, based on the updated private key, a secure communication channel between the client device and the third-party service, and redirecting, based on the authenticating, the client device to the third-party service.

In yet another embodiment of the invention, the updated private key comprising a time to live indicator and the updated private key is obtained prior to expiration of the time to live indicator.

In still another embodiment of the invention, the time to live indicator is determined by the third-party service.

In yet still another embodiment of the invention, the time to live indicator is approximately two hours.

In yet another additional embodiment of the invention, the time to live indicator is approximately thirty days.

Other objects, advantages and novel features, and further scope of applicability of the present invention will be set forth in part in the detailed description to follow, and in part will become apparent to those skilled in the art upon examination of the following, or may be learned by practice of the invention. The objects and advantages of the invention may be realized and attained by means of the instrumentalities and combinations particularly pointed out in the claims.

BRIEF DESCRIPTION OF THE DRAWINGS

The present disclosure is described by way of example and not limited in the accompanying figures in which like reference numerals indicate similar elements and in which.

DETAILED DESCRIPTION

By way of introduction, aspects discussed herein may relate to dynamically encrypting requests in accordance with embodiments of the invention. A business can provide a variety of services to its customers via a web interface. This allows customers to log in using any computing device to access the services provided by the business. In many instances, third-party providers can establish a relationship with the business to provide third-party services to the business's customers. The business may desire to provide direct access to the third-party services via their own website. However, each third-party service typically utilizes their own security mechanisms to secure their data and logins to their third-party services.

Systems and methods in accordance with embodiments of the invention automatically generate and manage security data for providing users access to a variety of third-party services. A user can click on a link in a web page and be automatically authenticated and sent over to the corresponding third-party service without having to enter any additional credentials. In this way, the user connection to the third-party service can be encrypted. Additionally, the security data used to authenticate the user connection can be automatically generated and refreshed to limit the ability of an attacker to decrypt secure communications. In this way, the breach of any security data will be of limited (or no) value as the security data is regularly updated and older versions of the security data are retired. In contrast to prior art systems which either do not update the security data and/or manually update the security data, the functioning of the computing system itself is improved by automatically generating and distributing security data along with improving the efficiency of the computer memory by deprecating old security data.

In a variety of embodiments, the security data can be automatically generated and stored using a secured database server system. The secured database server system can only allow access to particular computing devices, such as pre-authorized devices on the same network as the secured database server system. However, it may not be desirable to query the secured database server system to obtain the security data. For example, the secured database server system may not meet the computing demands of a live website and/or may limit the number of times a particular computing device can query the secured database server system in a particular time frame. In several embodiments, a computing device uses a caching system to obtain and store the security data used to authenticate the connections to third-party services. The caching system may only be accessible by the computing device. In a number of embodiments, the secured database server system (and/or other computing device generating the security data) publishes the security data using a notification service, such as a simple notification service provided by a variety of distributed computing systems, which can be obtained by the computing device for storage in its caching system. In this way, the computing device need not query (or even be aware of) the secured database server system to obtain the security data. This also means that, in the event of a security breach involving the computing device, the risk of an attacker locating or accessing the secured database server system is reduced or eliminated.

Operating Environments and Computing Devices

Figure 1:
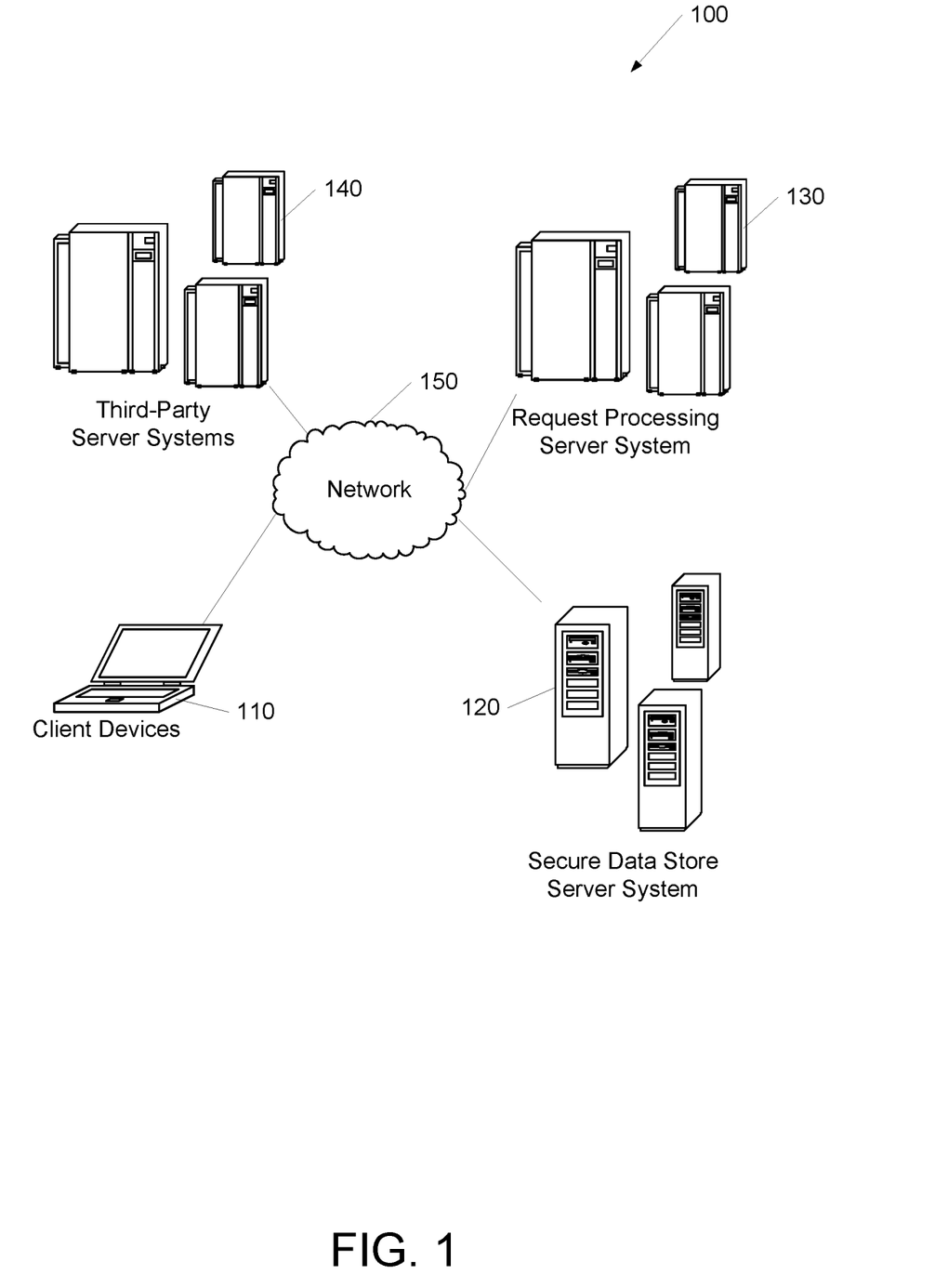
FIG. 1 shows an example of an operating environment in which one or more aspects described herein may be implemented.

FIG. 1 shows an operating environment 100. The operating environment 100 can include at least one client device 110, and/or at least one secure data store server system 120, at least one request processing server system 130, and at least one third-party server system 140 in communication via a network 150. It will be appreciated that the network connections shown are illustrative and any means of establishing a communications link between the computers can be used. The existence of any of various network protocols such as Transmission Control Protocol/Internet Protocol (TCP/IP), Ethernet, File Transfer Protocol (FTP), Hypertext Transfer Protocol (HTTP) and the like, and of various wireless communication technologies such as Global System for Mobile Communications (GSM), code-division multiple access (CDMA), Wi-Fi, and long-term evolution (LTE), is presumed, and the various computing devices described herein can be configured to communicate using any of these network protocols or technologies. Any of the devices and systems described herein can be implemented, in whole or in part, using one or more computing systems described with respect to FIG. 2.

Client devices 110 can provide queries and/or interact with data as described herein. Secure data store server system 120 can securely store a variety of data as described herein. Request processing server system 130 can automatically maintain security information for the third-party server systems 140 and/or authenticate client devices 110 to be redirected to third-party server systems 140 as described herein. Third-party server system 140 can provide third-party services as described herein. However, it should be noted that any computing device in the operating environment 100 can perform any of the processes and/or store any data as described herein. The computing devices can be publicly accessible and/or have restricted access. Access to a particular computing device can be limited based on access requirements for computing devices requesting access to the particular computing device.

Some or all of the data described herein can be stored using one or more databases. Databases can include, but are not limited to relational databases, hierarchical databases, distributed databases, in-memory databases, flat file databases, Extensible Markup Language (XML) databases, No Structured Query Language (NoSQL) databases, graph databases, and/or a combination thereof. Any file system can be used to store data using a database and/or flat file as appropriate. The network 150 can include a local area network (LAN), a wide area network (WAN), a wireless telecommunications network, and/or any other communication network or combination thereof. Processing server systems 130 and/or database server systems can include systems that perform computations on multiple central processing units (CPUs) or graphics processing units (GPUs) along with serverless environments that mirror recursive function calls. For example, a server system can include a variety of processing nodes, each processing node assigned to execute a single sub-query. The processing nodes can include distinct computing devices and/or virtualized computing devices executing on a single computing device. In this way, the server system can process each sub-query in parallel as described herein.

The data transferred to and from various computing devices in operating environment 100 can include secure and sensitive data, such as confidential documents, customer personally identifiable information, and account data. Therefore, it can be desirable to protect transmissions of such data using secure network protocols and encryption, and/or to protect the integrity of the data when stored on the various computing devices. A file-based integration scheme or a service-based integration scheme can be utilized for transmitting data between the various computing devices. Data can be transmitted using various network communication protocols. Secure data transmission protocols and/or encryption can be used in file transfers to protect the integrity of the data such as, but not limited to, File Transfer Protocol (FTP), Secure File Transfer Protocol (SFTP), and/or Pretty Good Privacy (PGP) encryption. In many embodiments, one or more web services can be implemented within the various computing devices. Web services can be accessed by authorized external devices and users to support input, extraction, and manipulation of data between the various computing devices in the operating environment 100. Web services built to support a personalized display system can be cross-domain and/or cross-platform, and can be built for enterprise use. Data can be transmitted using the Secure Sockets Layer (SSL) or Transport Layer Security (TLS) protocol to provide secure connections between the computing devices. Web services can be implemented using the Web Services Security (WS-Security) standard, providing for secure Simple Object Access Protocol (SOAP) messages using XML encryption. Specialized hardware can be used to provide secure web services. Secure network appliances can include built-in features such as hardware-accelerated SSL and Hypertext Transfer Protocol Secure (HTTPS), WS-Security, and/or firewalls. Such specialized hardware can be installed and configured in the operating environment 100 in front of one or more computing devices such that any external devices can communicate directly with the specialized hardware.

Figure 2:
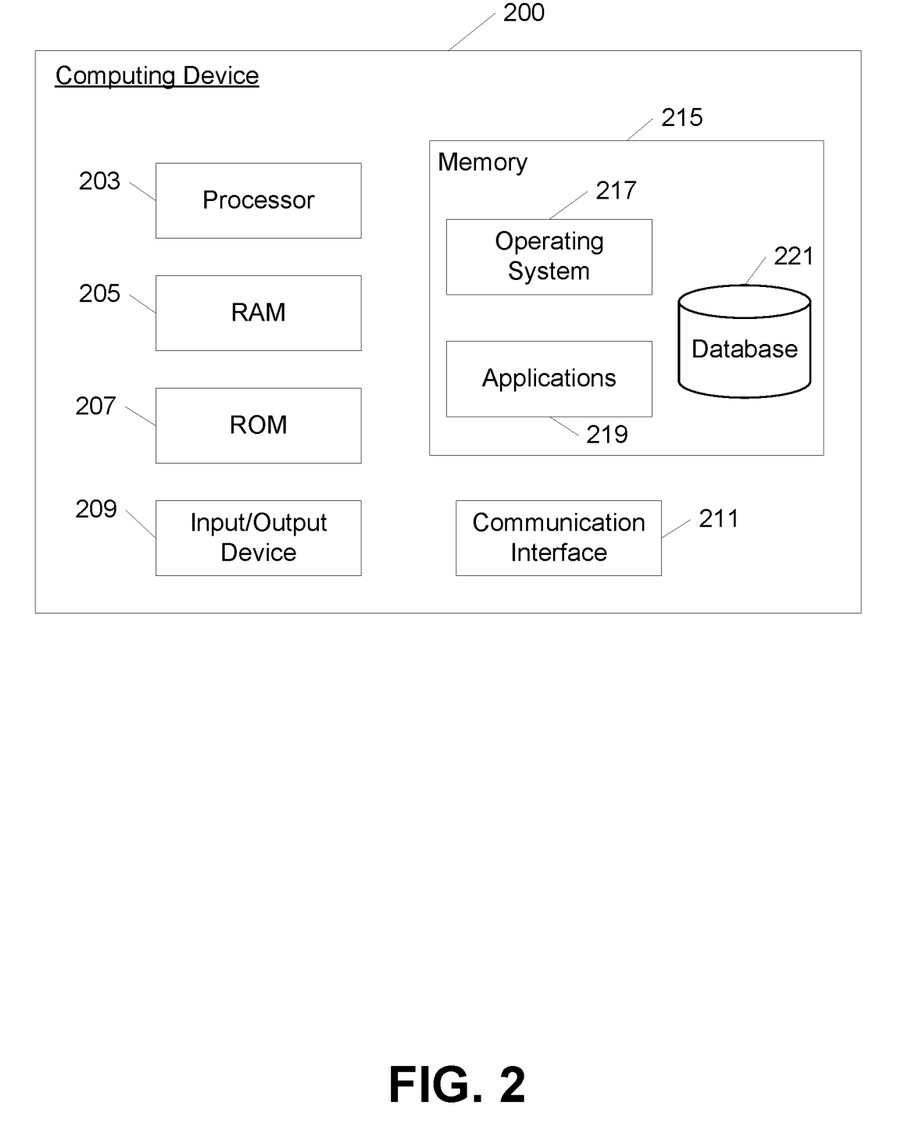
FIG. 2 shows an example computing device in accordance with one or more aspects described herein.

Turning now to FIG. 2, a conceptual illustration of a computing device 200 that can be used to perform any of the techniques as described herein is shown. The computing device 200 can include a processor 203 for controlling overall operation of the computing device 200 and its associated components, including random access memory (RAM) 205, read-only memory (ROM) 207, input/output device 209, communication interface 211, and/or memory 215. A data bus can interconnect processor(s) 203, RAM 205, ROM 207, memory 215, input/output (I/O) device 209, and/or communication interface 211. In some embodiments, computing device 200 can represent, be incorporated in, and/or include various devices such as a desktop computer, a computer server, a mobile device, such as a laptop computer, a tablet computer, a smart phone, any other types of mobile computing devices, and the like, and/or any other type of data processing device.

Input/output (I/O) device 209 can include a microphone, keypad, touch screen, and/or stylus through which a user of the computing device 200 can provide input, and can also include one or more of a speaker for providing audio output and a video display device for providing textual, audiovisual, and/or graphical output. Software can be stored within memory 215 to provide instructions to processor 203 allowing computing device 200 to perform various actions. Memory 215 can store software used by the computing device 200, such as an operating system 217, application programs 219, and/or one or more databases 221. The various hardware memory units in memory 215 can include volatile and nonvolatile, removable and non-removable media implemented in any method or technology for storage of information such as computer-readable instructions, data structures, program modules, or other data. Memory 215 can include one or more physical persistent memory devices and/or one or more non-persistent memory devices. Memory 215 can include, but is not limited to, random access memory (RAM) 205, read only memory (ROM) 207, electronically erasable programmable read only memory (EEPROM), flash memory or other memory technology, optical disk storage, magnetic cassettes, magnetic tape, magnetic disk storage or other magnetic storage devices, or any other medium that can be used to store the desired information and that can be accessed by processor 203.

Communication interface 211 can include one or more transceivers, digital signal processors, and/or additional circuitry and software for communicating via any network, wired or wireless, using any protocol as described herein. It will be appreciated that the network connections shown are illustrative and any means of establishing a communications link between the computers can be used. The existence of any of various network protocols such as TCP/IP, Ethernet, FTP, HTTP and the like, and of various wireless communication technologies such as GSM, CDMA, WiFi, and LTE, is presumed, and the various computing devices described herein can be configured to communicate using any of these network protocols or technologies.

Processor 203 can include one or more central processing units (CPU) and/or graphic processing units (GPU), which can include a single-core or multi-core processor along with multiple processors. Processor(s) 203 and associated components can allow the computing device 200 to execute a series of computer-readable instructions to perform some or all of the processes described herein. Although not shown in FIG. 2, various elements within memory 215 or other components in computing device 200, can include one or more caches including, but not limited to, CPU caches used by the processor 203, page caches used by the operating system 217, disk caches of a hard drive, and/or database caches used to cache content from database 221. For embodiments including a CPU cache, the CPU cache can be used by one or more processors 203 to reduce memory latency and access time. A processor 203 can retrieve data from or write data to the CPU cache rather than reading/writing to memory 215, which can improve the speed of these operations. In some examples, a database cache can be created in which certain data from a database 221 is cached in a separate smaller database in a memory separate from the database, such as in RAM 205 or on a separate computing device. For instance, in a multi-tiered application, a database cache on an application server can reduce data retrieval and data manipulation time by not needing to communicate over a network with a back-end database server. These types of caches and others can be included in various embodiments, and can provide potential advantages in certain implementations of devices, systems, and methods described herein, such as faster response times and less dependence on network conditions when transmitting and receiving data.

Although various components of computing device 200 are described separately, functionality of the various components can be combined and/or performed by a single component and/or multiple computing devices in communication without departing from the invention.

Request Routing Processes

Any of a variety of security data can be used to encrypt routing entries for a third-party service. For example, a public/private key pair can be used to encrypt the routing entries. A private key can be generated for a particular third-party service and the private key (and/or a corresponding public key generated based on the private key) can be used to encrypt the routing entry for the particular third-party service. For example, a notification indicating an updated private key has been issued for a third-party service can be obtained. Based on the notification, an updated public encryption key associated with the third-party service can be obtained and a routing entry indicating the security token for the third-party service can be encrypted. The encrypted routing entry and keys can be stored by a variety of computing devices, such as a routing request database, a caching system, and/or any other computing device described herein. A client device can request access to the third-party service. The request can be authenticated by decrypting the appropriate routing entry and using the security token indicated in the routing entry to establish a communication channel with the third-party service. The client device can then be redirected to the third-party service via the communication channel.

Figure 3:
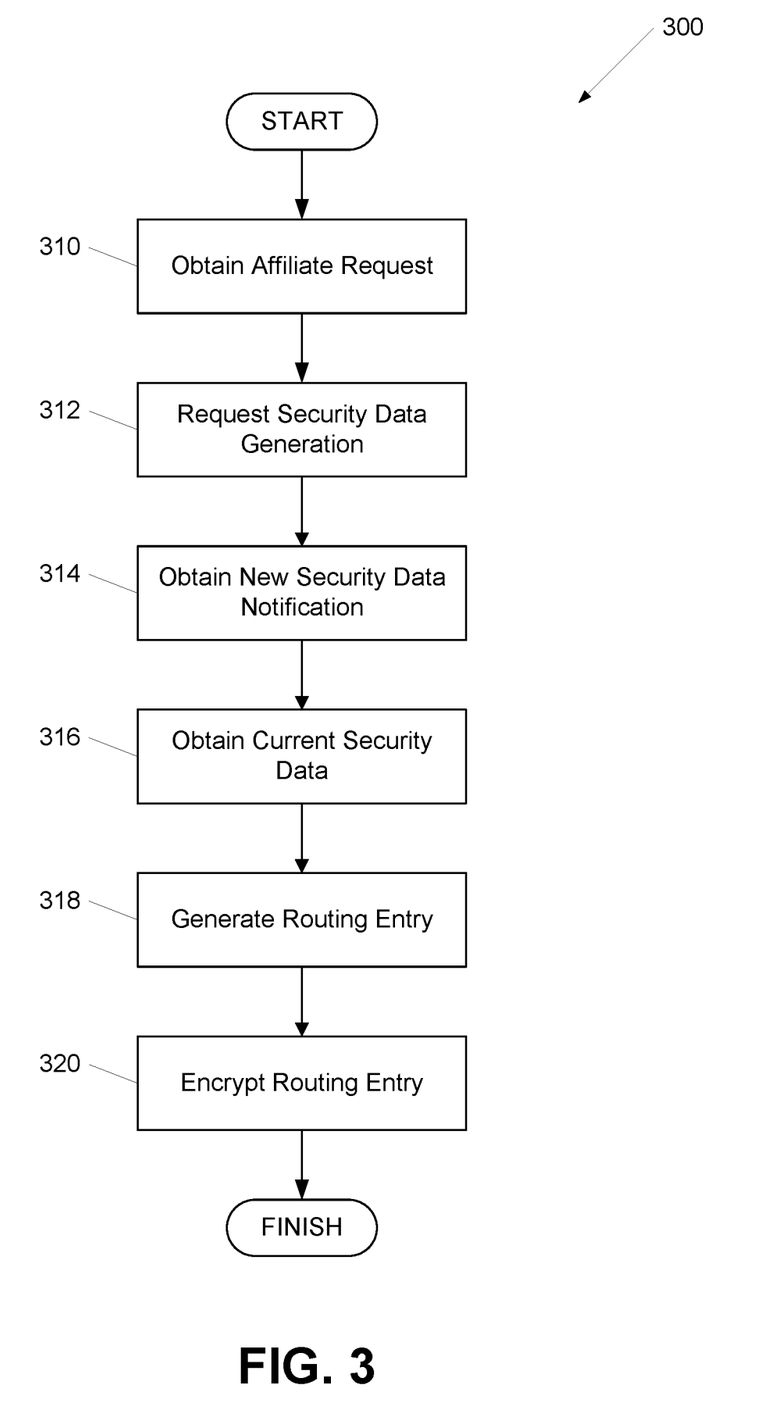
FIG. 3 shows a flow chart of a process for establishing an encrypted routing entry according to one or more aspects of the disclosure.

FIG. 3 shows a flow chart of a process for establishing an encrypted routing entry according to one or more aspects of the disclosure. Some or all of the steps of process 300 may be performed using one or more computing devices as described herein. In a variety of embodiments, some or all of the steps described below may be combined and/or divided into sub-steps as appropriate.

At step 310, an affiliate request can be obtained. An affiliate request can be obtained from a third-party server system. The affiliate request can indicate the third party and/or one or more third-party services provided by the third party. The third-party services can be identified using any identifier, such as a uniform resource locator, as appropriate. The affiliate request can also include a third-party security token for securing communication channels with the third-party services. The third-party security token can include any security mechanism, such as a public key of a public/private key pair, as appropriate. The third-party security token may be issued by the third party and/or any other security provider as appropriate. In many embodiments, the third-party security token is generated based on the affiliate request.

At step 312, a security data generation request can be provided. The security data generation request can be provided to a security provider, such as a third-party security service and/or a secure key generation computing device private to a particular entity, as appropriate. The security data can include any encryption data, such as a private/public key pair, a digital signature, a hash function, elliptic curves, and/or any other security data as appropriate.

At step 314, a new security data notification can be obtained. The new security data notification can be transmitted by the computing device generating the security data, a secure database server system storing the new security data, and/or any other computing device as appropriate. In many embodiments, the new security data notification is transmitted using a notification service provided by a distributed computing system, such as but not limited to Amazon Web Services, the Google Cloud Platform, Microsoft Azure, and the like. However, any notification can be utilized as appropriate.

At step 316, current security data can be obtained. The current security data can be obtained from the new security data notification, the computing device generating the security data, a secured database server system storing the security data, and/or any other computing device as appropriate. The current security data can be stored using a caching system and/or any other computing device. A caching system can include, but is not limited to a threaded cache provided by a distributed computing platform. The current security data can include the security data generated for the third party. It should be noted that each third party providing a third-party service can have its own security data and/or security data can be shared between two or more third parties as appropriate.

At step 318, a routing entry can be generated. The routing entry includes an indication of the third party, the third-party security token, the identifier for the third-party service(s), the time at which the routing entry was created, and/or any other information as appropriate. At step 320, the routing entry can be encrypted. The routing entry can be encrypted using the security data. The routing entry can be stored using the caching system, a routing database server system, and/or any other computing device as appropriate.

Figure 4:
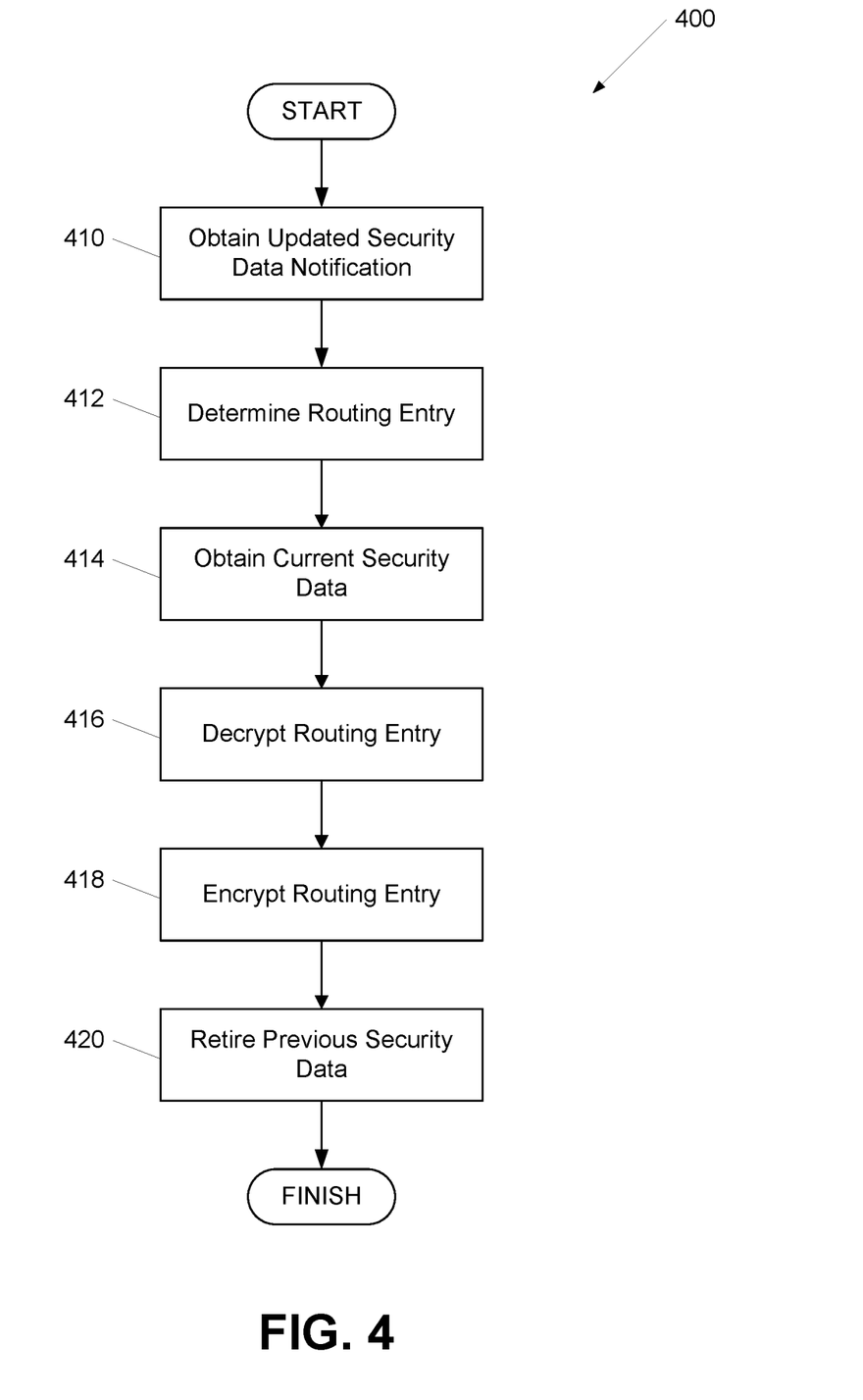
FIG. 4 shows a flow chart of a process for dynamically re-encrypting routing entries according to one or more aspects of the disclosure.

FIG. 4 shows a flow chart of a process for dynamically re-encrypting routing entries according to one or more aspects of the disclosure. Some or all of the steps of process 400 may be performed using one or more computing devices as described herein. In a variety of embodiments, some or all of the steps described below may be combined and/or divided into sub-steps as appropriate.

At step 410, an updated security data notification can be obtained. The updated security data notification can be transmitted by a computing device generating the updated security data, a secure database server system storing the updated security data, and/or any other computing device as appropriate. In many embodiments, the updated security data notification is transmitted using a notification service provided by a distributed computing system. The updated security data notification can indicate that updated security data for one or more third-party services has been generated. The updated security data can be stored using a caching system and/or any other computing device.

At step 412, a routing entry can be determined. The routing entry can be determined based on the third party and/or the third-party services indicated in the updated security data notification. A routing entry can be determined by querying a database server system, caching system, and/or any other computing device used to store routing entries as appropriate. At step 414, current security data can be obtained. The current security data can be the security data used to encrypt data associated with the third party as described herein. The current security data can be obtained from any of a variety of computing devices, such as a caching system, as described herein.

At step 416, a routing entry can be decrypted. In many embodiments, the determined routing entry is decrypted using the current security data associated with the third party. At step 418, the routing entry can be encrypted. In a number of embodiments, the routing entry is encrypted using the updated security data. The current security data can be set to be the previous security data and the updated security data can be set to be the current security data. The encrypted routing entry can be stored using the caching system, a routing database server system, and/or any other computing device as appropriate.

At step 420, the previous security data can be retired. Retiring the previous security data can include deleting the security data from a caching system, only using the retired security data to decrypt data encrypted using the retired security data, and the like. The previous security data can be retired based on a variety of criteria, such as a time-to-live (TTL) threshold, a number of usages of the security data (e.g. the number of routing entries encrypted and/or decrypted using the security data), the third party associated with the routing entry, and/or any other criteria as appropriate. In many embodiments, a TTL threshold can be any time period, such as two hours, one week, one day, thirty days, and the like.

Figure 5:
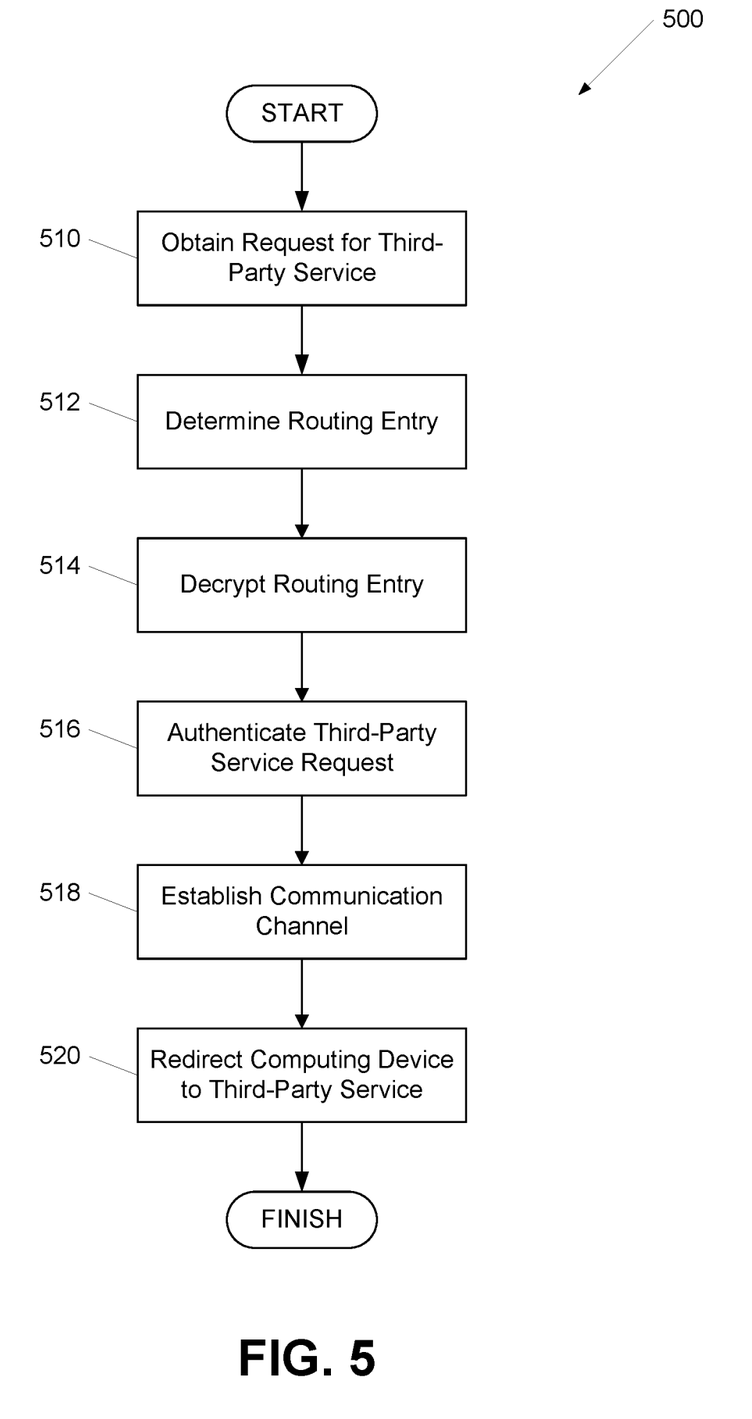
FIG. 5 shows a flow chart of a process for routing a request according to one or more aspects of the disclosure.

FIG. 5 shows a flow chart of a process for routing a request according to one or more aspects of the disclosure. Some or all of the steps of process 500 may be performed using one or more computing devices as described herein. In a variety of embodiments, some or all of the steps described below may be combined and/or divided into sub-steps as appropriate.

At step 510, a request for a third-party service can be obtained. The request for a third-party service can be obtained from any computing device, such as a user device accessing a feature on a website. The request can indicate the third party, the third-party service, and/or any other data as appropriate.

At step 512, a routing entry can be determined. The routing entry can be determined based on the third party and/or the third-party services indicated in the request. A routing entry can be determined by querying a database server system, caching system, and/or any other computing device used to store routing entries as appropriate. At step 514, a routing entry can be decrypted. In several embodiments, the routing entry is decrypted using the current security data associated with the third party.

At step 516, a third-party service request can be authenticated. The third-party service request can be authenticated using the routing entry. In many embodiments, the third-party service request is authenticated by providing the routing entry and/or any data indicated in the routing entry, such as a security token, as described herein, to a third-party server system providing the third-party service.

At step 518, a communication channel can be established. The communication channel can be established between the computing device providing the request and the third-party server system. In several embodiments, the communication channel is encrypted using a security token indicated in the routing entry. For example, the communication channel can be encrypted using Transport Layer Security, a Secure Sockets Layer, and/or any other encryption of a communication channel as appropriate.

At step 520, a computing device can be redirected to a third-party service. The computing device can be redirected to the third-party service by providing data to the computing device via the communication channel. In many embodiments, establishing the communication channel causes the third-party service to transmit data to the computing device. In a number of embodiments, establishing the communication channel causes the computing device to transmit data to the third-party service.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, and the like that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or XML. The computer executable instructions may be stored on a computer readable medium such as a hard disk, optical disk, removable storage media, solid-state memory, RAM, and the like. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a system, and/or a computer program product.

Although the present invention has been described in certain specific aspects, many additional modifications and variations would be apparent to those skilled in the art. In particular, any of the various processes described above may be performed in alternative sequences and/or in parallel (on different computing devices) in order to achieve similar results in a manner that is more appropriate to the requirements of a specific application. It is therefore to be understood that the present invention may be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A computer-implemented method comprising:
obtaining a notification indicating an updated private key has been issued for a third-party service;
obtaining, based on the notification, an updated public encryption key associated with the third-party service;
generating a security token for the third-party service, the security token associated with a caching system;
obtaining, from a secured database, the updated private key;
storing, using the caching system, a routing entry comprising the security token, wherein the routing entry is encrypted based on the updated private key;
receiving, from a client device, a request to access the third-party service;
authenticating the received request with the third-party service using the routing entry; and
redirecting, based on the authenticating, the client device to the third-party service.

2. The computer-implemented method of claim 1, wherein the notification is provided using a notification service provided by a distributed computing platform.

3. The computer-implemented method of claim 1, wherein:
the caching system stores a first private key issued for the third-party service; and
the computer-implemented method further comprises deleting, based on storing the updated private key, the first private key from the caching system.

4. The computer-implemented method of claim 1, wherein:
the caching system stores a first private key issued for the third-party service, the updated private key comprising a time to live indicator; and
the updated private key is obtained prior to expiration of the time to live indicator.

5. The computer-implemented method of claim 4, wherein the time to live indicator is determined by the third-party service.

6. The computer-implemented method of claim 4, wherein the time to live indicator is approximately two hours.

7. The computer-implemented method of claim 4, wherein the time to live indicator is approximately thirty days.

8. The computer-implemented method of claim 1, wherein redirecting the client device further comprises establishing, based on the updated private key, a secure communication channel between the client device and the third-party service.

9. An apparatus, comprising:
one or more processors; and
memory storing instructions that, when executed by the one or more processors, cause the apparatus to:
obtain a notification indicating an updated private key has been issued for a third-party service;
obtain, based on the notification, an updated public encryption key associated with the third-party service;
generate a security token for the third-party service and associated with a caching system, the caching system storing a first private key issued for the third-party service;
obtain, from a secured database and based on the security token, the updated private key;
store, using the caching system, a routing entry comprising the security token and wherein the routing entry is encrypted based on the updated private key;
delete, based on storing the updated private key, the first private key from the caching system;
receive, from a client device, a request to access the third-party service;
authenticate the received request with the third-party service using the routing entry; and
redirect, based on the authenticating, the client device to the third-party service.

10. The apparatus of claim 9, wherein the notification is provided using a notification service provided by a distributed computing platform.

11. The apparatus of claim 9, wherein:
the updated private key comprises a time to live indicator; and
the updated private key is obtained prior to expiration of the time to live indicator.

12. The apparatus of claim 11, wherein the time to live indicator is determined by the third-party service.

13. The apparatus of claim 11, wherein the time to live indicator is approximately two hours.

14. The apparatus of claim 11, wherein the time to live indicator is approximately thirty days.

15. The apparatus of claim 9, wherein the instructions, when executed by the one or more processors, cause the apparatus to redirect the client device by causing the apparatus to establish, based on the updated private key, a secure communication channel between the client device and the third-party service.

16. A non-transitory machine-readable medium storing instructions that, when executed by one or more processors, cause the one or more processors to perform steps comprising:
obtaining, from a simple notification service provided by a distributed computing platform, a notification indicating an updated private key has been issued for a third-party service;
obtaining, based on the notification, an updated public encryption key associated with the third-party service;
generating a security token for the third-party service, the security token associated with a caching system, the caching system storing a first private key issued for the third-party service;
obtaining, from a secured database and based on the security token, the updated private key;
storing, using the caching system, a routing entry comprising the security token, wherein the routing entry is encrypted based on the updated private key;
deleting, based on storing the updated private key, the first private key from the caching system;

receiving, from a client device, a request to access the third-party service;

authenticating the received request with the third-party service using the routing entry;

establishing, based on the updated private key, a secure communication channel between the client device and the third-party service; and redirecting, based on the authenticating, the client device to the third-party service.

17. The non-transitory machine-readable medium of claim 16, wherein the updated private key comprises a time to live indicator and the updated private key is obtained prior to expiration of the time to live indicator.

18. The non-transitory machine-readable medium of claim 17, wherein the time to live indicator is determined by the third-party service.

19. The non-transitory machine-readable medium of claim 17, wherein the time to live indicator is approximately two hours.

20. The non-transitory machine-readable medium of claim 17, wherein the time to live indicator is approximately thirty days.

\* \* \* \* \*